March 22, 1949.  R. J. McCOMBS  2,464,880
FISHING POLE ATTACHMENT
Filed May 22, 1945
FIG. 1
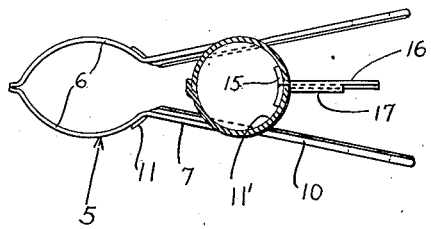
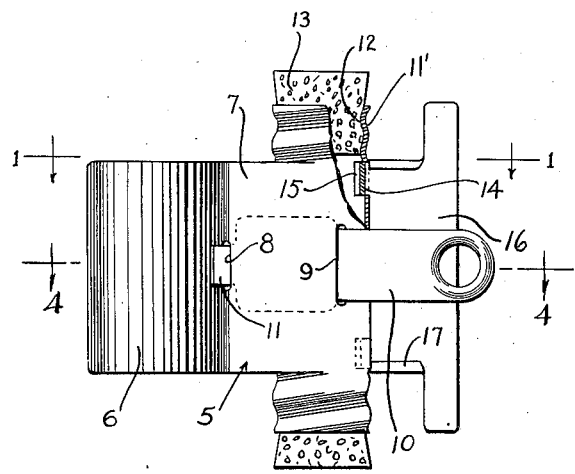
FIG. 2
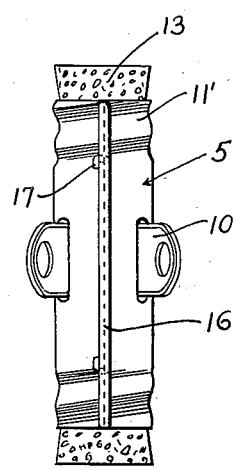
FIG 3
FIG. 4
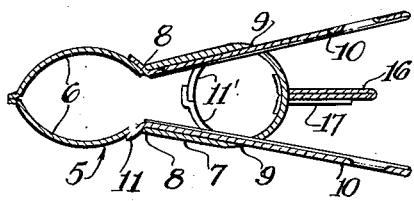
Inventor
ROBERT J. McCOMBS,
*Attorneys*

Patented Mar. 22, 1949

2,464,880

UNITED STATES PATENT OFFICE 2,464,880

FISHING POLE ATTACHMENT

Robert J. McCombs, South Bend, Ind.

Application May 22, 1945, Serial No. 595,112

3 Claims. (Cl. 43—25)

1

The present invention relates to attachments for fishing poles, and has for its primary object to provide novel means for fastening a fishing line to a fish pole not equipped with a reel to secure the excess portion of the line and hook when not in use in a manner to permit the convenient carrying of the pole without danger of injury to a person by contact with the hook, as well as to prevent entanglement of the line.

A further object of the invention is to provide an attachment of this character which may be readily applied to poles of various diameters.

Another object of the invention is to provide a device of this character which may be secured in a desired adjusted position on the handle end of the pole without requiring the use of special fastening devices for this purpose.

Another object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is an end view of the attachment with parts shown in section.

Figure 2 is a side elevational view with parts broken away and shown in section.

Figure 3 is a rear elevational view.

Figure 4 is a sectional view taken on the line 4—4 of Figure 2.

Referring now to the drawing in detail, wherein for the purpose of illustration I have disclosed a preferred embodiment of the invention, the numeral 5 designates a spring clamp generally which includes a pair of spring jaws 6 adapted for clamping engagement on a fishing pole, the jaws being connected to each other at one end.

The clamp 5 is formed of sheet material and includes substantially flat sides 7 adjacent the connected edges of the jaws in which front and rear spaced parallel slots 8 and 9 are formed, the rear slots 9 having flat handles 10 inserted therethrough to extend flatly against the inner surfaces of the flat portions 7 of the clamp, the front ends of the handles having tongues 11 formed thereon adapted for insertion outwardly through the slots 8, the rear ends of the handles projecting in diverging relation whereby upon a movement of the rear ends of the handles 10

2 toward each other to open the jaws 6, for mounting the clamp in a desired position on a fish pole.

The upper and lower edges of the connected ends of the jaws 6 are rounded to form relatively short tubes 11, whose edges overlap each other, the tubes 11' having internal spiral ribs and grooves 12 in the form of threads for receiving corks 13 in the tubes by a threading movement to hold the corks in position therein with the outer ends of the corks projecting above and below the respective tubes, as indicated in Figure 2 of the drawing.

The rear surface of the clamp 5 at the connected ends of the jaws 6 is formed with upper and lower slots 14 adapted for receiving tongues 15 projecting forwardly on the inner edge of a cleat 16 stamped from a flat sheet of metal, the tongues 15 being bent in opposite directions inwardly of the clamp to secure the tongues against withdrawal from the slots. The upper and lower edges of the cleat 16 are rolled or bent downwardly, as indicated at 17, to eliminate any sharp edges which might tend to cut a line when wound on the cleat.

In the operation of the device, the clamp 5 is secured in a desired position on the handle of a fish pole and when the line is not in use, the line may be wound on the cleat 16 and with the hook attached to the line embedded in the corks 13 at the upper and lower edges of the clamp.

The slack portion of the line is thus prevented from becoming entangled while the pole is being carried and the corks serve to hold the hook against danger of injury to persons coming into contact with the sharp end of the hook, as well as preventing the hook from catching in the garments of a person.

In view of the foregoing description taken in connection with the accompanying drawing, it is thought that the details of construction, manner of use and advantages of the device will be understood by those skilled in the art without further explanation.

While I have shown and described a preferred embodiment of the invention, it will be apparent that various changes in construction may be made without departing from the spirit and scope of the invention as hereinafter claimed.

Having thus described the invention, what I claim is:

1. An attachment for fish poles comprising a spring clamp including jaws adapted for gripping the sides of a fish pole, said jaws being integrally connected to each other, handles projecting rearwardly from the jaws to manipulate the jaws, a cleat secured to the connected ends of the jaws for winding a fish line thereon, tubes formed at the upper and lower connected edges of the jaws, and corks positioned in the tubes for embedding the barbs of fish hooks therein.

2. An attachment for fish poles comprising a spring clamp including jaws adapted for gripping the sides of a fish pole, said jaws being integrally connected to each other, handles projecting rearwardly from the jaws to manipulate the jaws, said connected ends of the jaws having slots therein, a sheet metal cleat having tongues projecting from one edge inserted in said slots and bent angularly to secure the cleat to the clamp, and a fibrous member carried by the clamp adjacent the cleat for embedding therein the barb of a hook attached to a line wound on the cleat.

3. In a spring clip, the combination of spring clamping elements with substantially semi-circular jaws and outwardly extending handles associated with the jaws adapted for holding the clip in clamping relation on a fishing rod, and a cord-winding cleat positioned on said spring clip, the outer edges of said jaws formed to provide sockets for mounting fish hook-receiving elements.

ROBERT J. McCOMBS.

REFERENCES CITED

The following references are of record in the file of this patent:

UNITED STATES PATENTS

| Number | Name | Date |
|---|---|---|
| 272,232 | Gaume | Feb. 13, 1883 |
| 363,533 | Munger | May 24, 1887 |
| 1,358,560 | Kennison | Nov. 9, 1920 |
| 1,582,196 | Van Blarcom | Apr. 27, 1926 |